United States Patent
Jiang et al.

(10) Patent No.: US 11,814,073 B2
(45) Date of Patent: Nov. 14, 2023

(54) LEARNING BASED CONTROLLER FOR AUTONOMOUS DRIVING

(71) Applicant: Baidu USA LLC, Sunnyvale, CA (US)

(72) Inventors: Shu Jiang, Sunnyvale, CA (US); Qi Luo, Sunnyvale, CA (US); Jinghao Miao, Sunnyvale, CA (US); Jiangtao Hu, Sunnyvale, CA (US); Yu Wang, Sunnyvale, CA (US); Jinyun Zhou, Sunnyvale, CA (US); Jiaming Tao, Sunnyvale, CA (US); Kecheng Xu, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 41 days.

(21) Appl. No.: 16/823,141

(22) Filed: Mar. 18, 2020

(65) Prior Publication Data

US 2021/0291862 A1    Sep. 23, 2021

(51) Int. Cl.
*B60W 60/00*    (2020.01)

(52) U.S. Cl.
CPC .... *B60W 60/0011* (2020.02); *B60W 60/0017* (2020.02); *B60W 60/00182* (2020.02)

(58) Field of Classification Search
CPC ......... B60W 60/0011; B60W 60/0017; B60W 60/00182
See application file for complete search history.

(56) References Cited

U.S. PATENT DOCUMENTS

| | | | |
|---|---|---|---|
| 10,971,005 B1* | 4/2021 | Adireddy | B60Q 5/006 |
| 2017/0103147 A1* | 4/2017 | Khanna | G06N 20/00 |
| 2017/0111827 A1* | 4/2017 | Norlin | H04W 24/08 |
| 2017/0168485 A1* | 6/2017 | Berntorp | G05D 1/0217 |
| 2019/0185004 A1* | 6/2019 | Kim | B60W 50/0097 |
| 2019/0186936 A1* | 6/2019 | Ebner | G06N 20/00 |
| 2019/0258251 A1* | 8/2019 | Ditty | G06V 20/58 |
| 2019/0265703 A1* | 8/2019 | Hicok | G05D 1/0242 |
| 2020/0130703 A1* | 4/2020 | Pendelton | A61B 5/165 |
| 2020/0369284 A1* | 11/2020 | Chen | B60W 50/0097 |
| 2021/0165409 A1* | 6/2021 | Berntorp | G05D 1/0217 |

* cited by examiner

*Primary Examiner* — James J Lee
*Assistant Examiner* — Wenyuan Yang
(74) *Attorney, Agent, or Firm* — WOMBLE BOND DICKINSON (US) LLP

(57) ABSTRACT

In one embodiment, a control command is generated with an MPC controller, the MPC controller including a cost function with weights associated with cost terms of the cost function. The control command is applied to a dynamic model of an autonomous driving vehicle (ADV) to simulate behavior of the ADV. One or more of the weights are based on evaluation of the dynamic model in response to the control command, resulting in an adjusted cost function of the MPC controller. Another control command is generated with the MPC controller having the adjusted cost function. This second control command can be used to effect movement of the ADV.

20 Claims, 8 Drawing Sheets

400

| Application 401 | Planning and Control 402 | Perception 403 | Device Driver(s) 404 | Firmware 405 | Hardware 406 |

FIG. 4

LEARNING BASED CONTROLLER FOR AUTONOMOUS DRIVING

TECHNICAL FIELD

Embodiments of the present disclosure relate generally to operating autonomous vehicles. More particularly, embodiments of the disclosure relate to a learning based controller for autonomous driving.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

A vehicle controller of an autonomous vehicle may generate control commands to move the vehicle according to a desired path or route. The controller may utilize static control algorithms.

A model predictive controller can generate a sequence of commands to be applied over future time frames that would cause a controlled object to move along a predicted path. The sequence of commands can be optimized with respect to different terms, such as, for example, cross-track error, heading error, and sudden changes in velocity, acceleration, heading, etc. The first of the sequence of commands is applied to the controlled object. At a subsequent time (e.g., the next cycle), this process is repeated and the first of the new sequence of commands is applied to the controlled object at each cycle.

Such a controller can be used to control and autonomous driving vehicle (ADV), to track along a target path with target speeds. An MPC (model predictive control) may use static optimization algorithms and a static vehicle model to generate the optimized sequence of commands. These control algorithms, however, may not account for changes in the vehicle's environment or changes in the vehicle. No matter what the vehicle's environment is and how much the vehicle physical status changes, the controller will use the same algorithm to achieve a desired speed and steering behavior. This can reduce safety and cause an uncomfortable driving experience.

BRIEF DESCRIPTION OF THE DRAWINGS

Embodiments of the disclosure are illustrated by way of example and not limitation in the figures of the accompanying drawings in which like references indicate similar elements.

FIG. 4 shows a block diagram illustrating system architecture for autonomous driving according to one embodiment.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, an on-line learning system updates parameters for a controller (e.g., a model predictive controller) based on a current physical environment of the autonomous driving vehicle, and a current physical status of the ADV. An MPC can generate a series of control commands, optimized based on predicted movements of the ADV. These predicted movements will track a target path or route (including position and heading along way points on the route) while optimizing terms to reduce undesirable conditions (e.g., large changes in speed, acceleration, and heading). Thus, control commands are optimized by the MPC and, when applied to ADV control actuators, will cause the ADV to track the target path.

These control commands are then applied to a vehicle dynamic model that represents the ADV, to simulate how the ADV will respond. In the simulation, real-time environmental conditions are accounted for, such as vehicle traffic, road conditions (e.g., wetness, slipperiness, ice), sensed obstacles, etc. The ADV may also have passengers or other cargo items that increase the mass of the ADV. Fuel, battery state of charge or battery state of health may also change. These changes can be accounted for in the simulation. The optimization parameters (e.g., weights or coefficients) of the MPC controller are evaluated and adjusted based on the simulation.

The adjusted MPC controller is used to generate one or more control commands that account for current environmental conditions of the ADV. This adjustment can occur periodically, e.g., on a per-driving cycle basis. In this manner, the MPC controller is adjusted 'on-line', periodically, while driving. Other aspects and details are discussed in the present disclosure.

Figure 1:
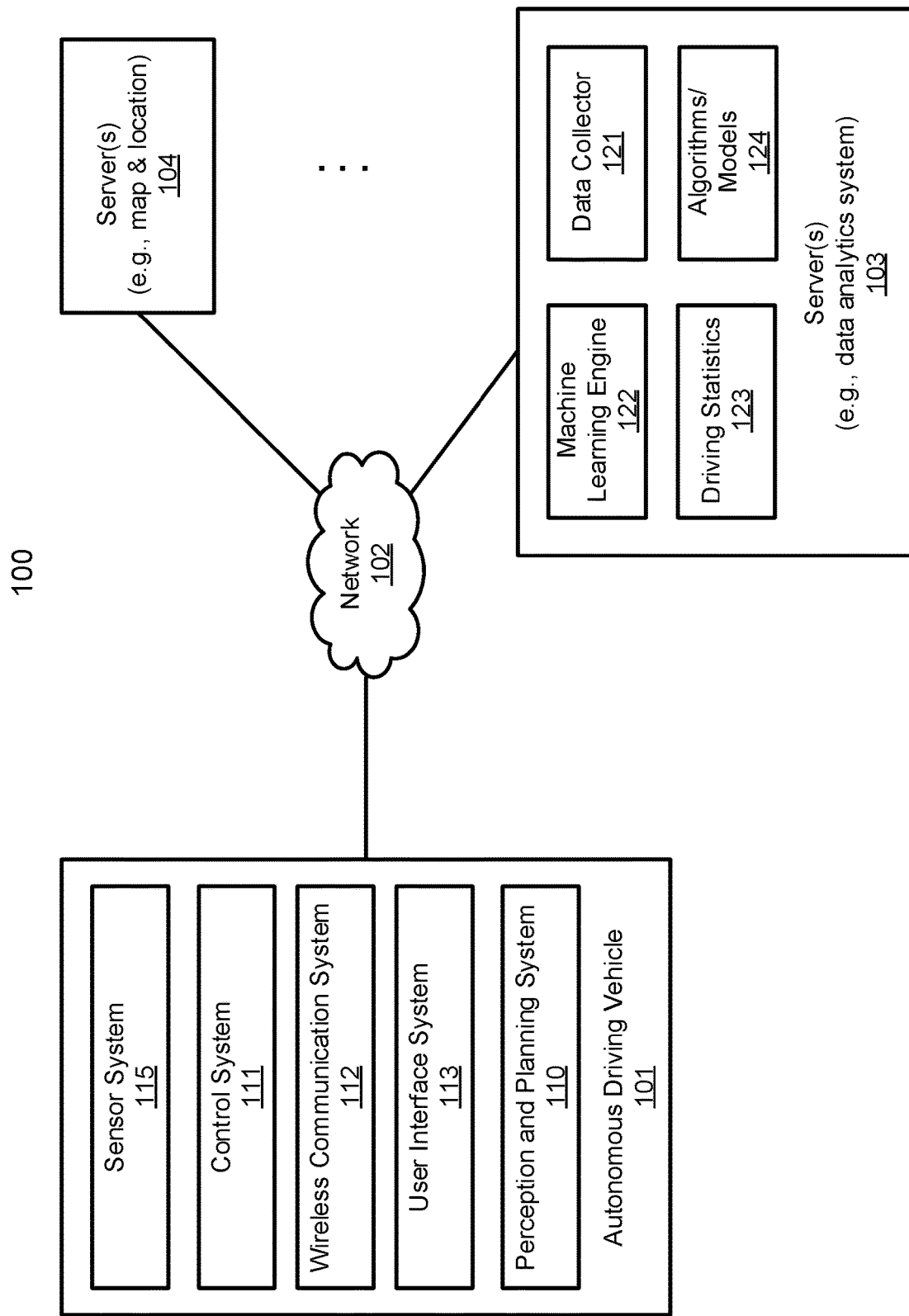
FIG. 1 is a block diagram illustrating a networked system according to one embodiment.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
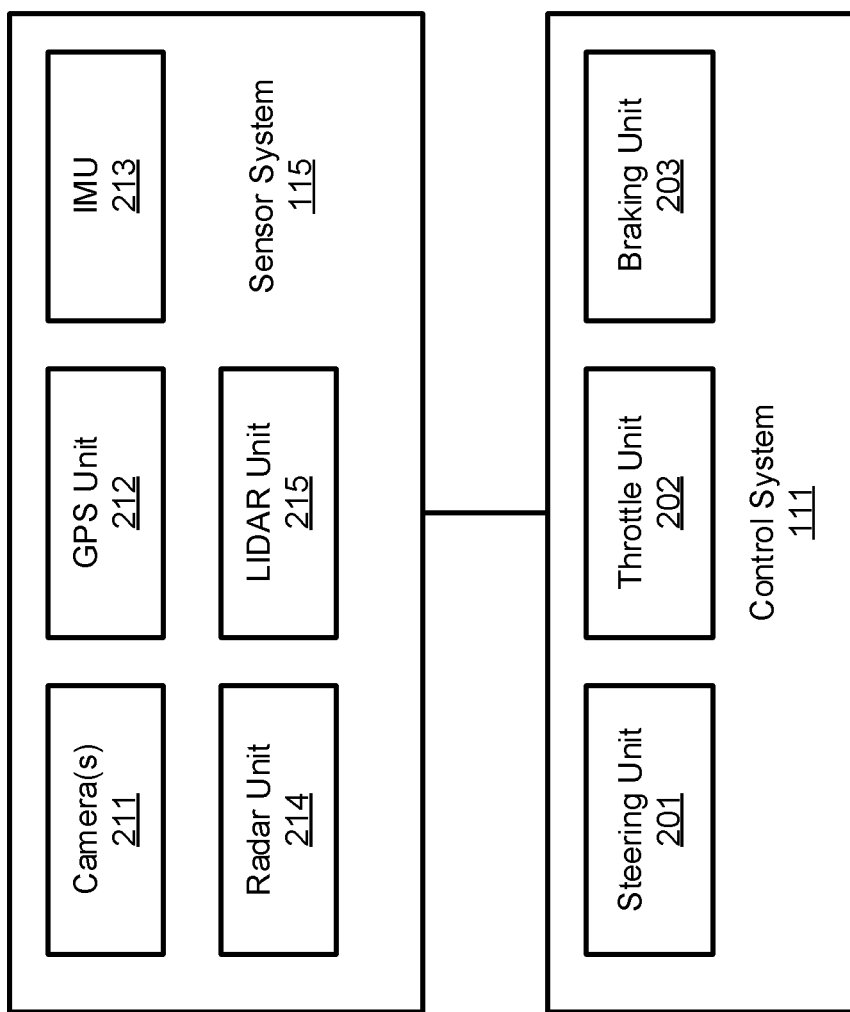
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using Wi-Fi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include algorithms used by a model predictive controller of the present disclosure. Algorithms 124 can then be uploaded on ADVs to be utilized during autonomous driving in real-time.

Figure 3A:
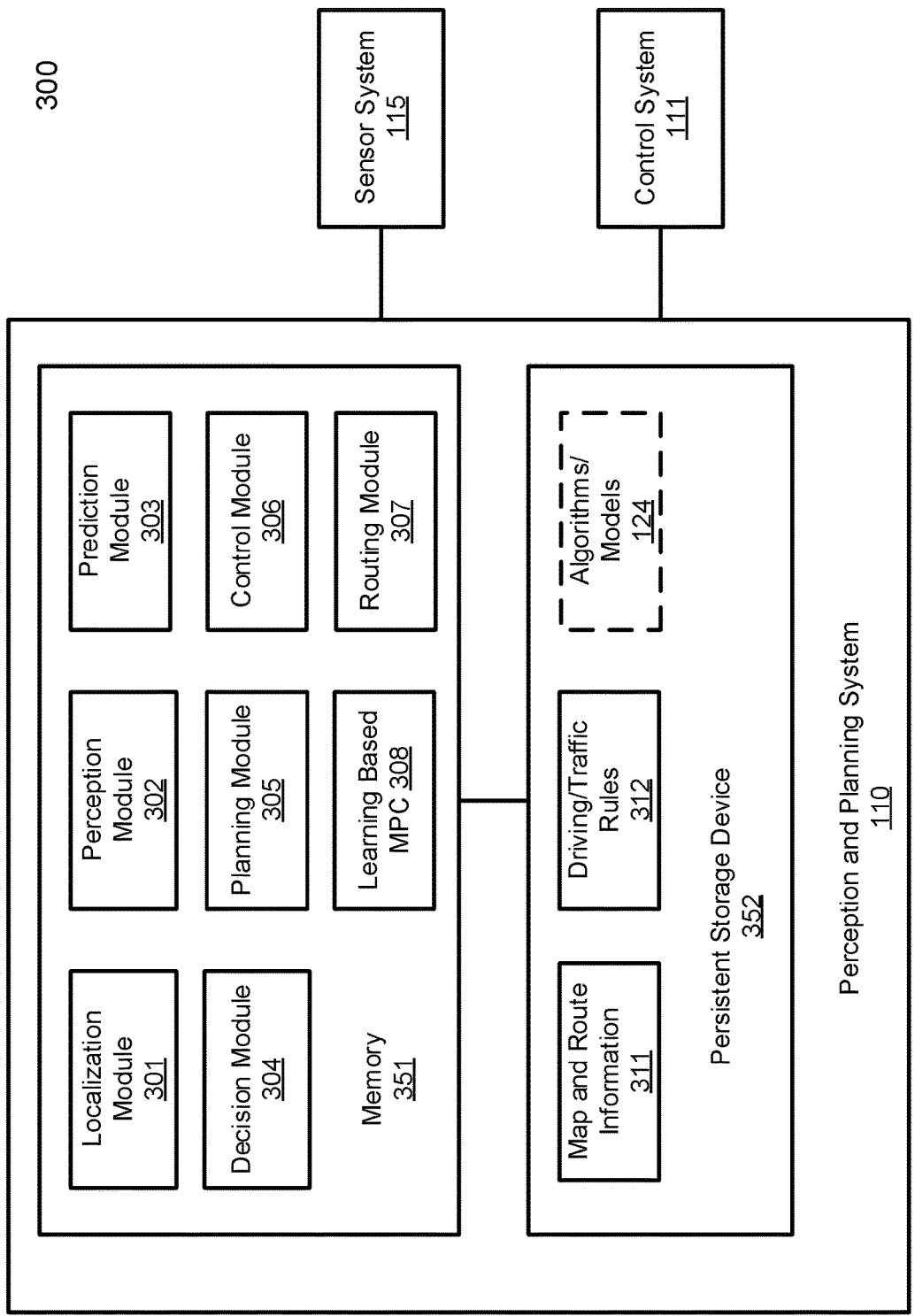
FIGS. 3A-3B are block diagrams illustrating an example of a perception and planning system used with an autonomous vehicle according to one embodiment.
Figure 3B:
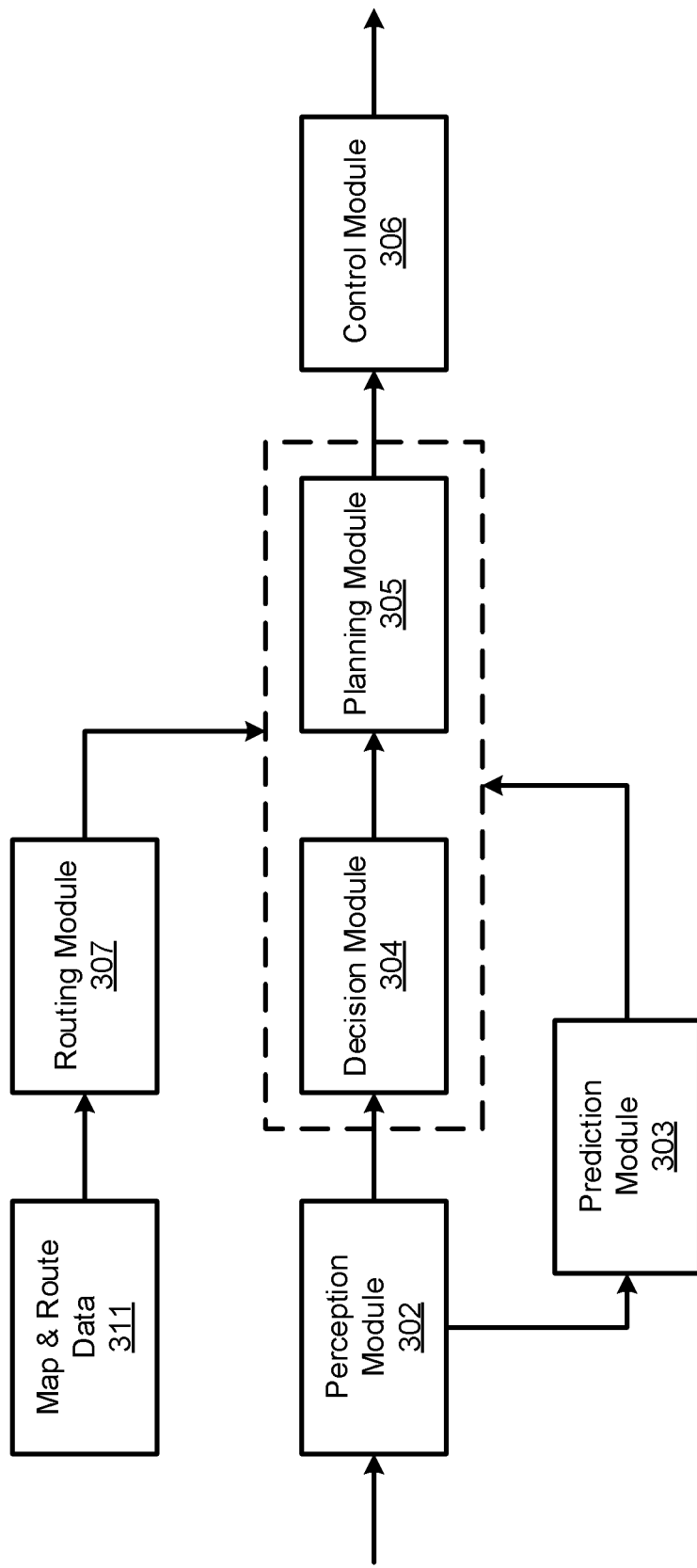

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307, and learning based MPC 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 miles per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Learning based MPC 308 includes an MPC controller having an optimizer and a vehicle model. The optimizer can use a cost function and the vehicle model to generate a sequence of control commands (e.g., throttle, steering, and/or brake commands) that track the vehicle's path along a target vehicle trajectory. These commands are generated while optimizing for different cost terms (e.g., cross-track error, heading error, speed, steering, acceleration, rate of change in steering, and/or rate of change of acceleration). Each of the cost terms can be represented in the cost function to penalize undesirable behavior. Weights can be associated and applied to each term (e.g., multiplication) to modify the impact of each term over the overall computed cost.

Learning based MPC module can be an on-line learning module, meaning that it continuously updates the MPC controller based on new data (e.g., the vehicle's environment and physical parameters), e.g., while the vehicle is driving. Learning-based MPC 308 may be integrated with another module, such as, for example, planning module 305 and/or control module 306.

A generic example of a cost function of an MPC controller is shown below, where J is the total computed cost, $w_x$ is a weight corresponding to a term x (x=1, 2, ... ), and N is a point along the target trajectory of the ADV.

$$J = \Sigma_{t=1}^{N} w_1 ||\text{term1}||^2 + w_2 ||\text{term2}||^2 + w_3 ||\text{term3}||^2 + + \Sigma_{t=1}^{N-1} w_4 ||\text{term4}||^2 +$$
$$w_5 ||\text{term5}||^2 + \Sigma_{t=2}^{N} w_6 ||\text{term6}||^2 + w_7 ||\text{term7}||^2 + \dots$$

The terms can be optimized by minimizing a computed cost J. The terms can include at least one of cross-track error (penalizing how far the ADV is from the target trajectory), heading error (penalizing an error between the ADV heading and the target trajectory direction at a point), speed cost (penalizing changes to speed), steering cost (penalizing changes in steering), acceleration cost (penalizing changes in acceleration), steering rate of change (penalizing how fast the steering changes), braking cost (penalizing braking), and acceleration rate of change (penalizing how fast acceleration changes). In some embodiments, the cost function includes at least two of the above terms. In other embodiments, the cost function includes all of the above terms. Sequential control commands (throttle, steering, braking) can be generated to optimally track the target trajectory, while accounting for the above terms.

These terms are generated by the MPC optimizer by using a static model of the ADV. The MPC predicts how the static model will move along the trajectory, in response to different control commands, to determine an optimized sequence of control commands based on the static model of the ADV, and minimizing the cost function.

The MPC, by itself, does not account for environmental factors or a current physical status in the ADV, both of which can vary while the vehicle travels to an intended destination along the trajectory. The vehicle model of the MPC controller can be a simplified vehicle model that includes the vehicle's size and mass. This vehicle model can be static, meaning that it is constant over time (e.g., from one frame to another frame).

The learning based MPC controller 308 feeds these control commands that are generated with the static MPC controller, into a vehicle dynamic model that includes the vehicle's mass and geometry (e.g., shape and size), but also includes additional dynamic parameters that model how the ADV will respond to different control commands and under different environmental conditions and under different physical status of the ADV (e.g., full tank, empty tank, low battery charge, wet brakes, etc.). The dynamic model also more accurately determines how the ADV will respond to particular commands (e.g., at higher speeds vs lower speeds) and at larger steering angles. The dynamic vehicle model can be generated from actual testing of a physical ADV, to more accurately represent how the ADV will behave under different speeds, road conditions, steering angles, with different passenger and cargo loads, etc.

The learning-based MPC 308 adjusts the model predictive controller based on evaluation of how the vehicle dynamic model behaves in response to the control commands. The weights of the MPC can be adjusted. This adjusted model predictive controller can then be used to generate a control command for the physical ADV. This can be repeated periodically, e.g., on a per-driving cycle basis. More aspects and details are discussed in other sections.

FIG. 4 is a block diagram illustrating system architecture for autonomous driving according to one embodiment. System architecture 400 may represent system architecture of an autonomous driving system as shown in FIGS. 3A and 3B. Referring to FIG. 4, system architecture 400 includes, but it is not limited to, application layer 401, planning and control (PNC) layer 402, perception layer 403, driver layer 404, firmware layer 405, and hardware layer 406. Application layer 401 may include user interface or configuration application that interacts with users or passengers of an autonomous driving vehicle, such as, for example, functionalities associated with user interface system 113. PNC layer 402 may include functionalities of at least planning module 305 and control module 306. Perception layer 403 may include functionalities of at least perception module 302. In one embodiment, there is an additional layer including the functionalities of prediction module 303 and/or decision module 304. Alternatively, such functionalities may be included in PNC layer 402 and/or perception layer 403. System architecture 400 further includes driver layer 404, firmware layer 405, and hardware layer 406. Firmware layer 405 may represent at least the functionality of sensor system 115, which may be implemented in a form of a field programmable gate array (FPGA). Hardware layer 406 may represent the hardware of the autonomous driving vehicle such as control system 111. Layers 401-403 can communicate with firmware layer 405 and hardware layer 406 via device driver layer 404.

Figure 5:
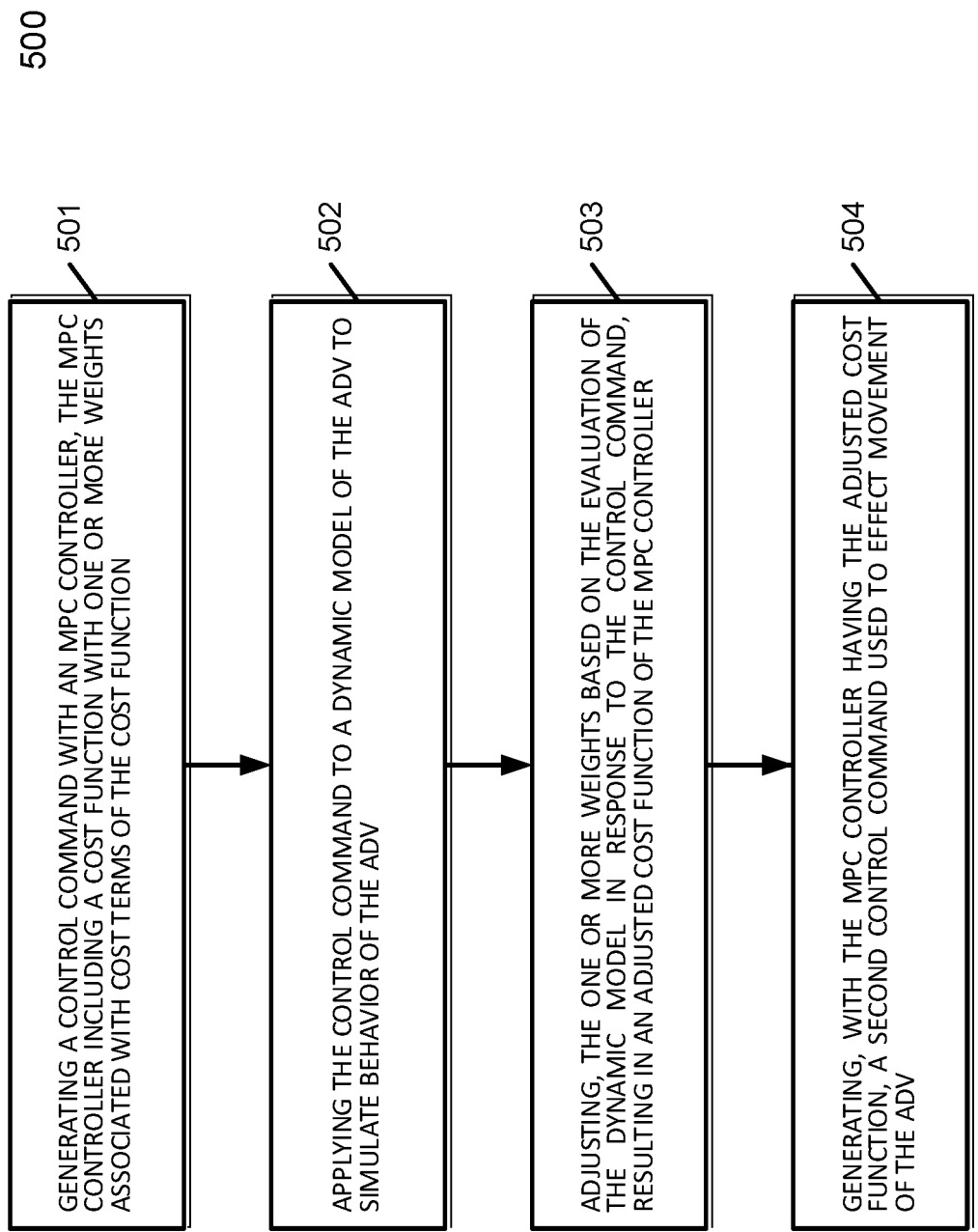
FIG. 5 shows a process for controlling an autonomous driving vehicle based on scenario, according to one embodiment.

FIG. 5 shows a process 500 for controlling an ADV with a learning-based model predictive controller, according to some embodiments. Operation 501 includes generating a control command with an MPC controller, the MPC controller including a cost function with one or more weights associated with cost terms of the cost function. This control command may not yet be adjusted according to the current environmental conditions and physical attributes of the ADV.

Operation 502 includes applying the control command to a dynamic model of the ADV to simulate behavior of the ADV. Although the MPC controller used in operation 501 may include a simplified model of the ADV, the dynamic model can more accurately model behavior of the ADV by accounting for more nuanced and non-linear behavior of the ADV, which can be determined through testing and experimentation.

Further, although not required, simulation of the dynamic model can be performed in a virtual environment that can include objects and structures that are currently sensed around the ADV, to account for the ADV's current environment when generating control commands. The virtual environment can include a two-dimensional or three-dimensional representation of a current environment around the ADV. Although simplified, this environment can include geometry that defines boundaries of objects (e.g., pedestrians, vehicles, structures), as well as road boundaries. This virtual environment can be generated based on sensed data from sensor system 115, and/or information from map and route information 311, localization module 301, and other modules from perception and planning system 110.

Operation 503 includes adjusting the one or more weights based on the evaluation of the dynamic model in response to the control command, resulting in an adjusted cost function of the MPC controller. For example, this operation can determine one or more scores associated with the one or more weights based on evaluation of the dynamic model in response to the control command. The evaluation can also be solely based on one or more environmental conditions around the ADV, such as wetness, vehicle traffic, etc. As discussed, the MPC controller used at block 501 can include a cost function that has terms that are optimized while tracking the ADV along a target trajectory. These terms can each have associated weights to adjust how much emphasis is placed on each term, e.g., relative to the other. Each term can be evaluated (e.g. scored) based on how the dynamic model behaves in the simulated environment.

For example, if environmental conditions are wet, causing the ADV to slip more than usual, then the steering term can be evaluated with disfavor (low scores), to discourage steering changes. In return, the weights associated with these terms may then be adjusted with an increase to further penalize steering under wet conditions. The adjusted MPC here will generate new control commands with less aggressive steering.

In another example, analysis of the dynamic model in a simulated environment may show that the dynamic model moves too close to sensed objects like curbs, pedestrians, or other vehicles. Again, terms will be evaluated and weights for cross-tracking and heading errors may be increased to further penalize these errors so that the ADV more aggressively tracks along the target trajectory. When the objects are no longer sensed, then these weights can be lowered (e.g., in subsequent cycles) to relax the ADV controls and improve ADV ride comfort.

In another example, the ADV may sense that traffic is light. Under these conditions, the weighting associated with a speed term can be reduced so that speed increases are penalized less. Thus, the learning based MPC can increase speed more aggressively (e.g., towards a speed limit constraint) when traffic is light. Conversely, when traffic is high, the weight associated with the speed cost term can be increased, to further penalize faster speeds.

In another example, when traffic is high, the weights associated with braking may be decreased, to reduce penalty for braking. It should be understood that although 'high' traffic and 'low' traffic are relative terms; thresholds or other known mechanisms can be implemented to deduce whether traffic is low or high.

In another example, the ADV experiences physical changes while driving. For example, brakes can get hot or wet, thereby changing the vehicle's response to brake commands. The ADV may take on passengers or cargo that change the mass of the ADV. An amount of gasoline in the ADV's tank, or a state of charge or state of health of an electric ADV may also change the way the vehicle responds to throttle, steering and brake commands. The same result can result in different ADV behavior, when the ADV experiences physical changes. Changes to physical attributes of the ADV can be sensed by ADV's sensor system and used to update the dynamic model of the ADV and/or used to directly evaluate the weights of the cost terms. Thus, the dynamic model and/or the weights can be representative of the current state of the ADV.

Operation 504 includes generating, with the MPC controller having the adjusted cost function, a second control command used to effect movement of the ADV. In such a manner, the learning-based MPC controller uses a control algorithm that is optimized for current physical attributes of the ADV and the ADV's current environment. It should be understood that the ADV's current environment includes the ADV's effective environment, for example, within an effective perimeter around the ADV that is relevant to the ADV's control command. This can be, for example, 10 meters, 20 meters, 30 meters, 40 meters, etc. Such a perimeter can vary based on application and can be determined through routine test and experimentation.

Figure 6:
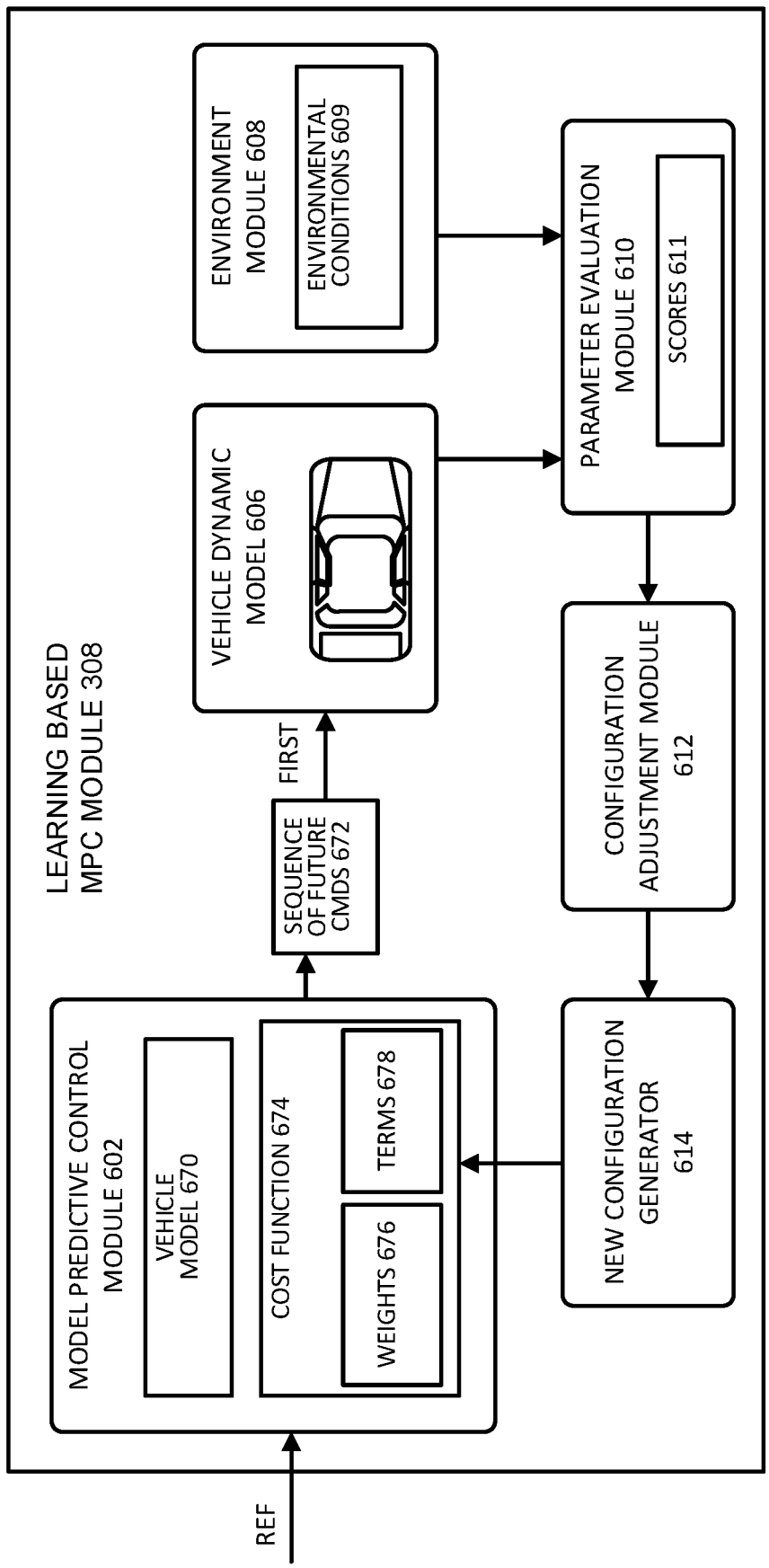
FIG. 6 shows a learning based model predictive controller according to one embodiment.

FIG. 6 shows a learning-based MPC module 308 according to some embodiments. A reference is provided to a model predictive control module 602. The reference can include, for example, a target ADV trajectory, current heading, and current speed of the ADV.

The MPC module 602 can include a vehicle model 670 and a cost function 674. The cost function can include cost terms 678, and associated weights 676. The MPC module can generate a sequence of future commands 672 (e.g., throttle, brake, and steering) that will predictively effect movement of the vehicle model such that the vehicle model tracks the reference, while minimizing the cost function.

A first of the sequence of commands is taken and applied to a vehicle dynamic model 606 to simulate a more accurate representation of vehicle behavior than that which is generated at MPC module 602. As discussed, this vehicle dynamic model 606 can include dynamic response of the ADV that can be determined based on testing of actual ADVs. Such responses may be non-linear and more accurately reflect the ADV's dynamic behavior than the vehicle model 670 of the MPC module 602. As mentioned, the vehicle dynamic model may also include physical attributes of the ADV that may vary during driving (e.g., brake wetness, fuel state, battery state, passengers and cargo). The vehicle dynamic model can have adjusted responses to control commands based on these physical attributes.

An environment module 608 can gather information describing environmental conditions 609 currently around the ADV, such as a pedestrian, another vehicle, a road boundary, or a structure, road conditions (wetness, slipperiness, ice, snow), weather conditions, and vehicle traffic.

A parameter evaluation module 610 can evaluate the vehicle dynamic behavior with respect to the reference, for example, to see how well the vehicle dynamic model tracked the trajectory. The vehicle dynamic model can generate a different trajectory from the predicted trajectory that is generated by MPC module 602, because the vehicle models are different. At parameter evaluation module 610, behavior of the dynamic model's response to the control command can be evaluated with respect to the current environmental conditions.

In some embodiments, evaluation of the dynamic model in response to the control command is based on at least one of: proximity of the dynamic model to a pedestrian, another vehicle, or a structure; a speed of the dynamic model with reference to a speed constraint; an acceleration of the dynamic model with respect to an acceleration constraint; a location of the dynamic model with respect to a road boundary or path; changes in heading, or speed that can cause ride discomfort; and control effort. Scores 611 can be generated for the weights of the cost function, based on how well each of the terms performed in the dynamic model. For example, if the predicted path of the dynamic model comes too close to a pedestrian, then weights may be adjusted to increase penalty for speed, acceleration, and acceleration increases.

At the configuration adjustment module, a plurality of permutations of the one or more weights can be evaluated until the scores reach a desired range. Those one or more weights that generate the scores in the desired range can be taken as the one or more weights of the adjusted cost function. At new configuration generator 614, an adjusted cost function is generated with the adjusted weights. The adjusted cost function is then used as the active cost function. In other words, the MPC controller with the adjusted cost function can then generate another control command.

The control command that is fed to vehicle controls can be the first of a sequence of another sequence of control commands generated by the updated MPC controller. As described, the MPC controller generates the sequence of control commands through optimizing terms by minimizing a cost function (in this case, the adjusted cost function) while satisfying the target control objective. The target control objective here is to track along a reference trajectory.

Figure 7:
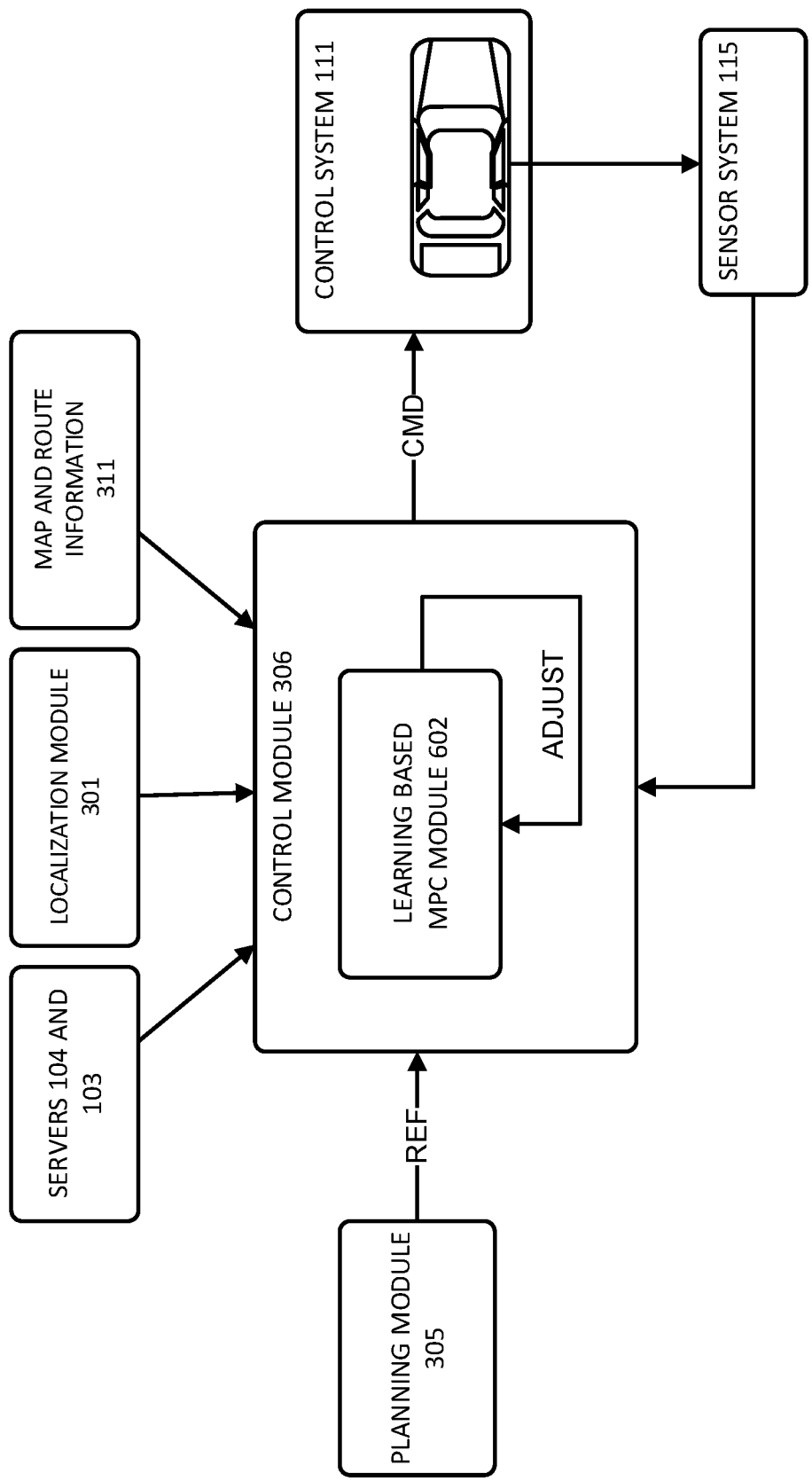
FIG. 7 shows a system for controlling an autonomous driving vehicle based on a learning based model predictive controller according to one embodiment.

An ADV system is shown in FIG. 7 having a control module 306 that uses a learning based MPC module to control the ADV. Planning module 305 can generate a path or route that the control module uses as a reference. This path or route can be determined by the planning module based on a reference line, as described in other sections. The path or route can be taken as the target trajectory for which learning based MPC module 602 will try to track.

As discussed, learning based MPC module can adjust dynamically (e.g., while the ADV is driving) to account for real-time environmental conditions of the ADV. These environmental conditions can be gathered from servers 104 and 103, as well as localization module 301, map and route information 311, sensor system 115, and other modules. After adjusting to the environment, and accounting for physical attributes of the ADV, the MPC module can generate and optimized control command (e.g., throttle, steering, and/or brake) to be communicated to the control system 111.

It should be understood that the MPC can generate, for a single driving cycle, a throttle, steering, and/or brake command. In other words, for a single driving cycle, multiple commands can be generated (for different control units) and communicated to respective control units (e.g., steering actuator, throttle actuator, brake actuator) to effect a corresponding and proportionate movement of the ADV.

The sensor system 115 can feed ADV information back to the control module 306, such as, for example, current heading, current steering, current speed, etc. The learning based MPC module can self-adjust periodically, so that the control module generates control commands that account for environmental factors around the ADV and physical attributes of the ADV that may change over time.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A method for operating an autonomous driving vehicle (ADV), the method comprising:
generating a control command with an MPC (model predictive control) controller, the MPC controller including an optimizer using a cost function configured with one or more weights associated with cost terms of the cost function wherein the control command is associated with a first trajectory of the ADV;
performing a simulation in a three-dimensional virtual environment with a dynamic model of the ADV that includes one or more physical attributes that are representative of a current state of the ADV including a passenger or cargo in the ADV;
in the simulation, applying the control command generated by the MPC to the dynamic model of the ADV to simulate a behavior of the ADV with the passenger or the cargo in the ADV and generate a second trajectory of the dynamic model in the three-dimensional virtual environment;
adjusting the one or more weights based on an evaluation of the dynamic model with the passenger or the cargo in response to the control command of the MPC controller in the simulation to adjust the second trajectory of the dynamic model to track the first trajectory of the ADV, resulting in an adjusted cost function of the MPC controller wherein adjusting the one or more weights includes decreasing one of the one or more weights that is associated with a speed cost term, to increase speed more aggressively, in response to one or more current environmental conditions indicating low vehicle traffic;
generating, with the MPC controller having the adjusted cost function, a second control command used to effect movement of the ADV; and
controlling movement of the ADV according to the second control command.

2. The method of claim 1, wherein the evaluation of the dynamic model is performed with respect to the one or more current environmental conditions around the ADV, including at least one of: a pedestrian, another vehicle, a road boundary, or a structure, weather, road wetness or slip, and vehicle traffic.

3. The method of claim 2, wherein adjusting the one or more weights includes increasing one of the one or more weights that is associated with a steering cost term, to penalize steering, in response to the one or more current environmental conditions indicating the road wetness or the slip.

4. The method of claim 2, wherein the second control command includes at least one of a throttle command, a steering command, or a brake command.

5. The method of claim 2, wherein adjusting the one or more weights includes decreasing one of the one or more weights that is associated with a brake cost term, to reduce penalty for braking, in response to the one or more current environmental conditions indicating high vehicle traffic.

6. The method of claim 1, wherein the first trajectory is generated through a planning module of the ADV.

7. The method of claim 1, wherein the one or more physical attributes of the ADV further includes at least one of: brake condition, battery state of charge, or an amount of fuel.

8. The method of claim 1, wherein the MPC controller includes a simplified model of the ADV used with the cost function to generate an optimized sequence of control commands, the simplified model of the ADV having less accurate of a representation of the ADV than the dynamic model of the autonomous driving vehicle.

9. The method of claim 1, wherein the evaluation of the dynamic model in response to the control command is based on at least one of: proximity of the dynamic model to a pedestrian, another vehicle, or a structure; a speed of the dynamic model with reference to a speed constraint; an acceleration of the dynamic model with respect to an acceleration constraint, a location of the dynamic model with respect to a road boundary or path; changes in heading, or speed that can cause ride discomfort; and control effort.

10. The method of claim 1, wherein the control command includes at least one of: a throttle command, a steering command, a brake command.

11. The method of claim 1, wherein the cost terms of the cost function include at least one of: cross-track error, heading error, speed cost, steering cost, acceleration cost, steering rate of change, braking, and acceleration rate of change.

12. The method of claim 1, wherein generating the control command includes applying the MPC controller to a target control objective to generate a sequence of control commands, and taking, as the control command, a first of the sequence of control commands, the sequence of control commands being optimized by minimizing the cost function while satisfying the target control objective.

13. The method of claim 12, wherein generating the second control command includes applying the MPC controller having the adjusted cost function to the target control objective to generate a second sequence of control commands, and taking, as the second control command, a first of the second sequence of control commands, the second sequence of control commands being optimized by minimizing the adjusted cost function while satisfying the target control objective.

14. A non-transitory machine-readable medium having instructions stored therein, which when executed by a processor, cause the processor to perform operations of operating an autonomous driving vehicle (ADV), the operations comprising:
generating a control command with an MPC (model predictive control) controller, the MPC controller including an optimizer using a cost function configured with one or more weights associated with cost terms of the cost function wherein the control command is associated with a first trajectory of the ADV;
performing a simulation in a three-dimensional virtual environment with a dynamic model of the ADV that includes one or more physical attributes that are representative of a current state of the ADV including a passenger or cargo in the ADV;
in the simulation, applying the control command generated by the MPC to the dynamic model of the ADV to simulate a behavior of the ADV with the passenger or the cargo in the ADV and generate a second trajectory of the dynamic model in the three-dimensional virtual environment;
adjusting the one or more weights based on an evaluation of the dynamic model with the passenger or the cargo in response to the control command of the MPC controller in the simulation to adjust the second trajectory of the dynamic model to track the first trajectory of the ADV, resulting in an adjusted cost function of the MPC controller wherein adjusting the one or more weights includes decreasing one of the one or more weights that is associated with a speed cost term, to increase speed more aggressively, in response to one or more current environmental conditions indicating low vehicle traffic;
generating, with the MPC controller having the adjusted cost function, a second control command used to effect movement of the ADV; and
controlling movement of the ADV according to the second control command.

15. The non-transitory machine-readable medium of claim 14, wherein the evaluation of the dynamic model is performed with respect to the one or more current environmental conditions around the ADV, including at least one of: a pedestrian, another vehicle, a road boundary, or a structure, weather, road wetness or slip, and vehicle traffic.

16. The non-transitory machine-readable medium of claim 15, wherein adjusting the one or more weights includes increasing one of the one or more weights that is associated with a steering cost term, to penalize steering, in response to the one or more current environmental conditions indicating the road wetness or the slip.

17. A data processing system, comprising:
a processor; and
a memory coupled to the processor to store instructions, which when executed by the processor, cause the processor to perform operations of operating an autonomous driving vehicle (ADV), the operations including
generating a control command with an MPC (model predictive control) controller, the MPC controller including an optimizer using a cost function configured with one or more weights associated with cost terms of the cost function wherein the control command is associated with a first trajectory of the ADV;
performing a simulation in a virtual environment with a dynamic model of the ADV that includes one or more physical attributes that are representative of a current state of the ADV including a passenger or cargo in the ADV;
in the simulation, applying the control command generated by the MPC to the dynamic model of the ADV to simulate a behavior of the ADV with the passenger or the cargo in the ADV and generate a second trajectory of the dynamic model in the three-dimensional virtual environment;
adjusting the one or more weights based on an evaluation of the dynamic model with the passenger or the cargo in response to the control command of the MPC controller in the simulation to adjust the second trajectory of the dynamic model to track the first trajectory of the ADV, resulting in an adjusted cost function of the MPC controller wherein adjusting the one or more weights includes decreasing one of the one or more weights that is associated with a speed cost term, to increase speed more aggressively, in response to one or more current environmental conditions indicating low vehicle traffic;

generating, with the MPC controller having the adjusted cost function, a second control command used to effect movement of the ADV; and controlling movement of the ADV according to the second control command.

18. The data processing system of claim 17, wherein the evaluation of the dynamic model is performed with respect to the one or more current environmental conditions around the ADV, including at least one of: a pedestrian, another vehicle, a road boundary, or a structure, weather, road wetness or slip, and vehicle traffic.

19. The data processing system of claim 18, wherein adjusting the one or more weights includes increasing one of the one or more weights that is associated with a steering cost term, to penalize steering, in response to the one or more current environmental conditions indicating the road wetness or the slip.

20. He data processing system of claim 18, wherein adjusting the one or more weights includes decreasing one of the one or more weights that is associated with a brake cost term, to reduce penalty for braking, in response to the one or more current environmental conditions indicating high vehicle traffic.

\* \* \* \* \*